Figure 1:
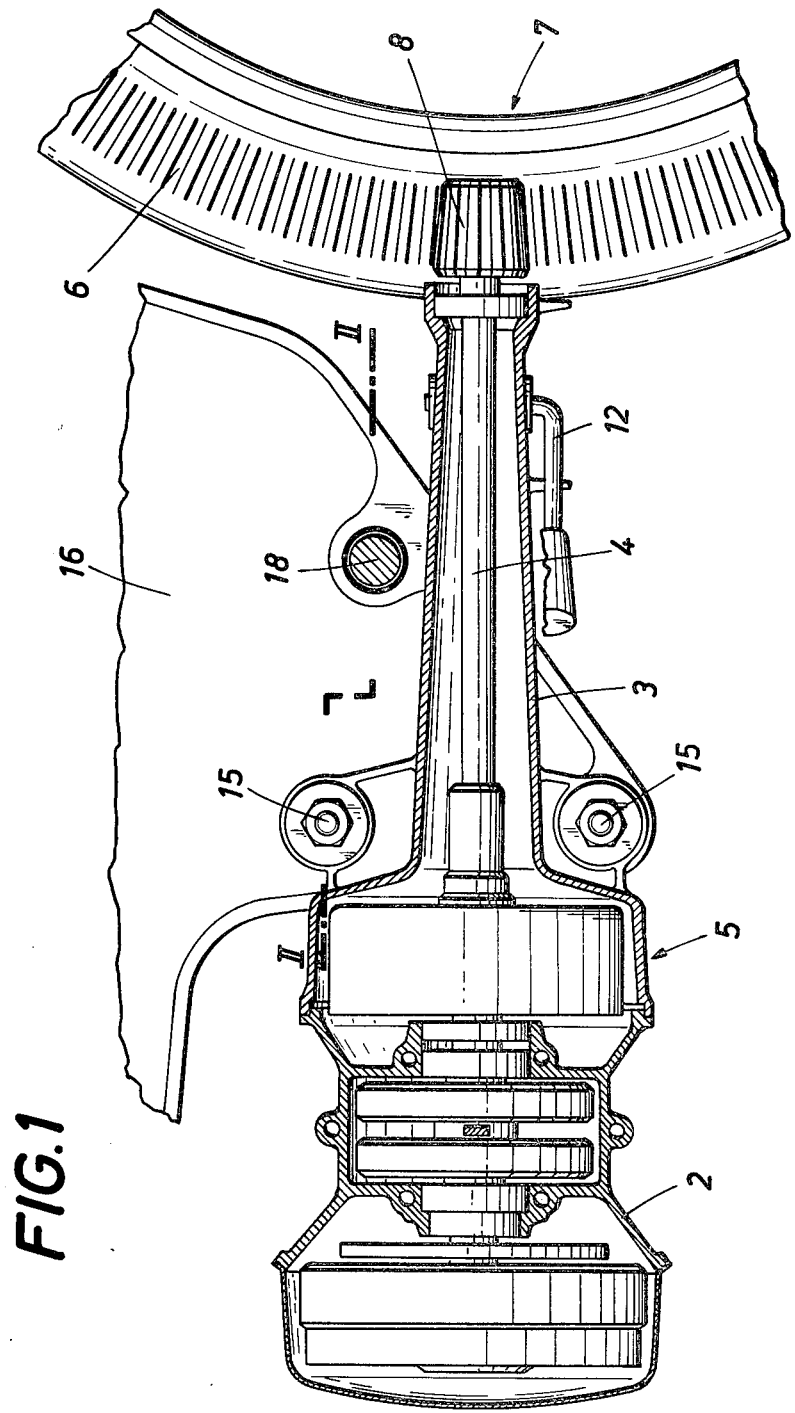

United States Patent [19]

Resele

[11] 4,195,705
[45] Apr. 1, 1980

[54] DRIVE MEANS FOR POWER-ASSISTED BICYCLE

[75] Inventor: Peter Resele, Graz, Austria

[73] Assignee: Steyr-Daimler-Puch Aktiengesellschaft, Vienna, Austria

[21] Appl. No.: 895,446

[22] Filed: Apr. 11, 1978

[51] Int. Cl.² ............................................. B62K 11/04
[52] U.S. Cl. ...................................... 180/205; 74/194; 74/207; 180/221; 180/74
[58] Field of Search ................. 180/33 C, 33 D, 33 R, 180/74, 31; 74/207, 194, 196, 197

[56] References Cited

U.S. PATENT DOCUMENTS

| 1,259,989 | 3/1918 | Hult | 180/33 R |
| 3,891,044 | 6/1975 | Tiede | 180/33 D |

FOREIGN PATENT DOCUMENTS

| 934662 | 5/1948 | France | 180/33 D |
| 44548 | 10/1914 | Sweden | 180/33 D |

*Primary Examiner*—John P. Silverstrim
*Attorney, Agent, or Firm*—Kurt Kelman

[57] ABSTRACT

A drive for a road wheel mounted in the frame of a motor-assisted bicycle comprises a drive housing pivotal transversely to the plane of the wheel and connected to the frame by an interposed elastomeric sleeve deformable by the pivotal movement of the drive housing. An engine in the housing has a crankshaft and a drive shaft is non-rotatably connected to the crankshaft. A bevel wheel is non-rotatably mounted on the drive shaft and a pressure roller is aligned with the bevel wheel in the axial direction of the road wheel, the bevel wheel and pressure roller being engageable with the road wheel on opposite sides thereof. A spring arm secured to the housing and carrying the pressure roller normally urges the bevel wheel and pressure roller into engagement with the respective sides of the road wheel. A rotatable spreading cam pivoted to the housing and disposed between the housing and the spring arm is manually operable to move the spring arm away from the housing so as to move the roller out of engagement with the road wheel and a stop on the frame engages the spring arm on further manual operation of the cam to retain the spring arm to perform the pivotal movement of the housing under the elastic deformation of the sleeve to disengage the bevel wheel from the road wheel.

6 Claims, 2 Drawing Figures

DRIVE MEANS FOR POWER-ASSISTED BICYCLE

This invention relates to drive means for power-assisted bicycles, comprising a unit which comprises an engine and a drive shaft, which constitutes a crankshaft extension and extends radially to the driven road wheel of the vehicle, which unit is secured to the frame of the vehicle and pivotally movable transversely to the plane of the road and comprises a bevel wheel, which is secured to the drive shaft and laterally engages the road wheel, and a pressure roller disposed on the other side of the road wheel and cooperating with the bevel wheel, said bevel wheel and pressure roller being adapted to be moved apart against spring force.

Known drive means of that kind are disclosed in U.S. Pat. No. 1,259,989 and comprise a gear, which is secured to the drive shaft between the crankshaft and the bevel wheel and in mesh with an idler gear, which meshes with a second idler gear of equal size, and a pinion, which is driven by the second idler gear. The second idler gear and the pinion are disposed in a housing and rotatably mounted on a shaft which is non-rotatably connected to the pressure roller. Said housing is pivoted on the axis of the second idler gear and is connected to a gear housing, which belongs to the unit and surrounds the first idler gear and the gear which is mounted on the drive shaft and is mesh with the first idler gear. The two housings are forced against each other by a tension spring which is extended when the bevel wheel and the pressure roller are moved apart. To move the bevel wheel and the pressure roller apart, the two housings are pivotally moved. On the side opposite to the tension spring, each housing is connected to a common chain, which must be pulled so that the two connections of the chain to the housings are moved toward each other against the force of the tension spring so that the housings are pivotally moved and the bevel wheel and the pressure roller are thus moved apart. This arrangement is relatively complicated and expensive and in spite of the driving of the pressure roller the torque which can be exerted is not higher than in an arrangement in which only the bevel wheel is driven. It will be understood that the bevel wheel and the pressure roller are moved apart in order to disengage these two members from the road wheel so that force is no longer transmitted between the road wheel and engine and it is possible to use only a pedal drive without imparting a movement to the engine. A disadvantage of the known drive means resides in that the positions to which the bevel wheel and the pressure roller are moved apart by the pulling of the chain are not defined. Under certain circumstances, the pressure roller may be disengaged from the road wheel whereas the bevel wheel remains in force-transmitting engagement with the road wheel. Besides, the unit is secured to the frame of the vehicle by simple pivot pins so that noise and shakes are transmitted from the unit to the vehicle frame. Moreover, no restoring forces will be exerted by when the unit is pivotally moved as a result of a lateral excursion of the road wheel.

It is an object of the invention to eliminate these disadvantages and to provide drive means which are of the kind described first hereinbefore and are simpler and less expensive in structure and ensure that the bevel wheel and pressure roller will assume defined positions when disengaged from the vehicle wheel, and the transmission of noise and shakes to the vehicle frame is minimized.

This object is accomplished according to the invention in that the pressure roller is mounted on a spring arm, which is attached to the housing of the unit, a spreading cam is provided between the spring arm and the housing of the unit, a hand lever is provided, which is operable to rotate the spreading cam lever, and the unit is secured to the vehicle frame by means of elastomeric sleeves.

Because the pressure roller is carried by a spring arm, there is no need for a separate spring and the structure is particularly simple. A reliable operation is ensured by the provision of the spreading cam. If the spreading cam is pivoted to the vehicle frame and acts on the unit housing and on the spring arm on the same time, the bevel wheel and the pressure roller will be reliably disengaged from the road wheel without need for additional measures. The use of elastomeric sleeves for securing the unit to the vehicle frame results in the desired cushioning to reduce the transmission of noise and shakes to the vehicle frame. The elastomeric material permits of a transverse pivotal movement of the unit with respect to the road wheel plane and are adapted to exert a restoring force.

For structural reasons, it may be preferable to pivot the spreading cam to the unit. In that case the vehicle frame is provided with a stop and the spring arm engages said stop when the spring arm and the unit housing have been moved apart to about one-half of the extent to which they can be moved apart. In such an arrangement, a rotation of the spreading cam from its position of rest causes the spring arm to be bent away from the road wheel until the spring arm engages the stop. A continued rotation of the spreading cam will then result in a pivotal movement of the entire unit so that the bevel wheel is disengaged from the road wheel. Owing to the specific dimensions, the bevel wheel and the pressure roller are then spaced approximately equal distances apart from the road wheel.

A further feature of the invention resides in that the spreading cam is spaced apart in position of rest from the spring arm and cooperates with a return spring, which consists preferably of a leaf spring. When the spreading cam in position of rest is disengaged from the spring arm, the latter can follow any thickness variations of the wheel tire engaged by the bevel wheel. The provision of the return spring affords the advantage that the spreading cam returns to its position of use when it has been actuated and is resiliently held in its position of rest so that it cannot create undesirable noise.

An embodiment of the invention is shown by way of example on the drawings, in which FIG. 1 is a vertical sectional view showing drive means for a power-assisted bicycle, the section being taken on a plane which contains the axis of the crankshaft and crankshaft extension.

Figure 2:
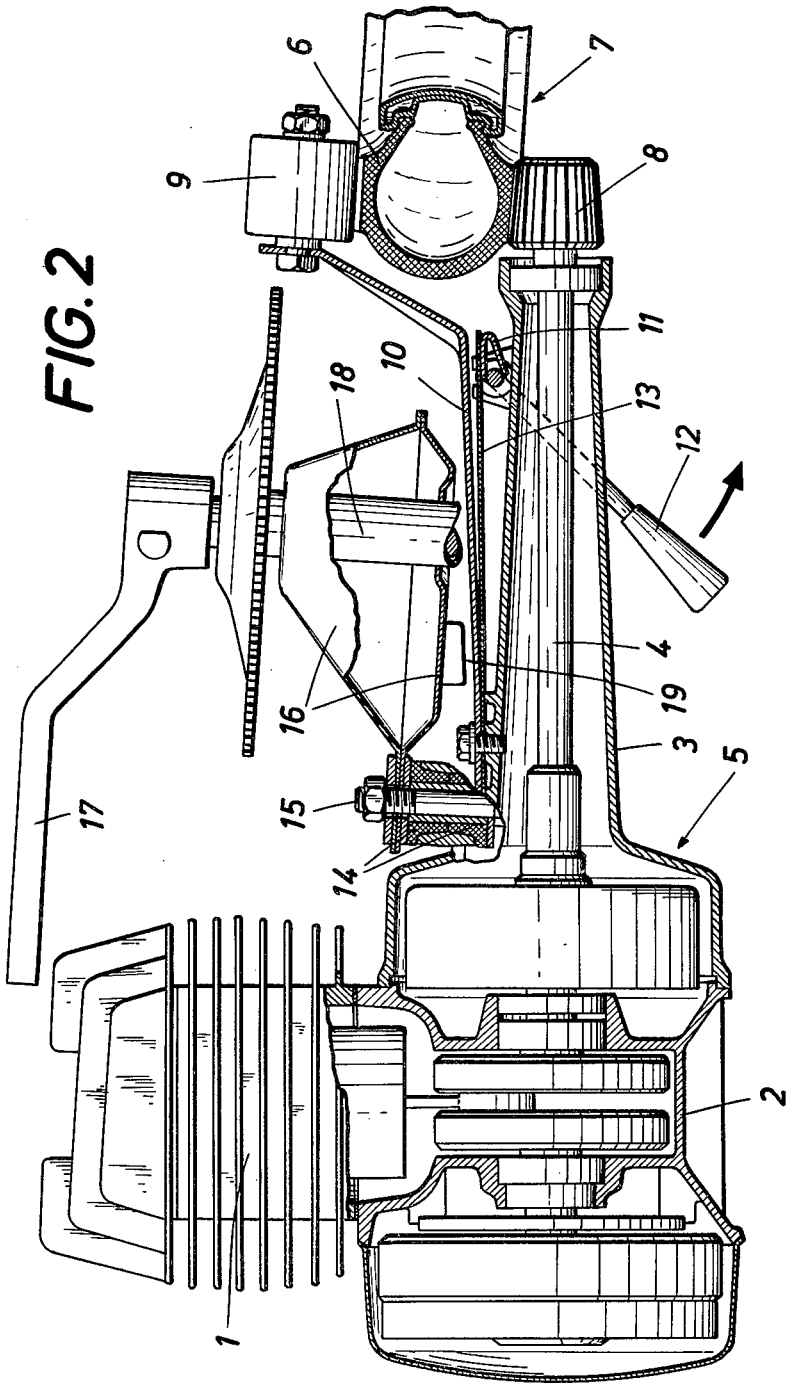

FIG. 2 is a corresponding horizontal sectional view and shows the upper mounting of the unit and the pedal region in a section taken on line II—II in FIG. 1.

The drive means according to the invention comprise a unit 5, which includes an engine 1, a crankcase 2 and a drive shaft 4, which constitutes a crankshaft extension and is accommodated in a housing 3, which is connected to the crankcase 2. The drive shaft 4 extends radially of a road wheel 7 of the vehicle and carries a bevel wheel 8, which has serrations, which are engageable with a tire 6 of the road wheel. The tire 6 has serrated side faces so that the bevel wheel 8 and the tire 6 can mesh with each other, although such meshing is not essential. A pressure roller 9 is associated with the bevel wheel 8 and disposed on the other side of the road wheel 7 and is mounted on a spring arm 10, which is screw-connected to the housing 3 of the unit 5. A spreading cam 11 of sheet metal is disposed between the spring arm 10 and the drive housing 3 and is pivoted to the drive housing 3 and can be rotated by a hand lever 12. A return spring 13 consisting of a leaf spring holds the spreading cam 11 in a position of rest, shown on the drawings. The unit 5 is secured to a frame 16 of the vehicle at two points by means of rubber sleeves 14 and bolts and nuts 15 to perform a limited pivotal movement, which is transverse to the road wheel plane, because the rubber sleeves 14 can be elastically deformed.

When it is desired to disengage the bevel wheel 8 and the pressure roller 9 from the tire 6, e.g., when it is desired to drive the wheel 7 in the conventional manner only by means of the pedals 17 mounted on the pedal shaft 18, and by means of a chain and chain sprockets, the hand lever 12 is pivotally moved in the counterclockwise sense in FIG. 2. During that movement, the hand lever 12 first engages the spring arm 10, which is subsequently pivotally moved toward the vehicle frame 16 until the spring arm 10 engages a stop 19, which is secured to the frame. During this movement, the spring arm 10 is elastically deformed and the pressure roller 9 is disengaged from the tire 6, as a result of the elastic deformation of the spring arm 10. During a continued pivotal movement of the hand lever 12 and of the spreading cam 11, the stop 19 retains the spring arm 10 so that the entire unit 5 is pivotally moved in the clockwise sense and the bevel wheel 8 is also disengaged from the tire 6. This pivotal movement is permitted by the rubber sleeves 14.

What is claimed is:

1. In a motor-assisted bicycle comprising a frame and a driven road wheel mounted in said frame for rotation in a plane: drive means for driving said road wheel, said drive means comprising a drive housing carried by said frame and adapted to perform a pivotal movement transverse to said plane, elastomeric sleeve means interposed between, and connected to, said drive housing and said frame, the sleeve means being adapted to be elastically deformed by said pivotal movement, an engine in said drive housing and having a crankshaft, a drive shaft non-rotatably connected to, and axially aligned with, said crankshaft and extending radially with respect to said road wheel, a bevel wheel non-rotatably mounted on said drive shaft and engageable with said road wheel on one side thereof, a pressure roller aligned with said bevel wheel in the axial direction of said road wheel and engageable with the latter on the side opposite to said bevel wheel, a spring arm secured to said housing and carrying said pressure roller, the spring arm normally urging said bevel wheel and pressure roller into engagement with the respective sides of said road wheel, a rotatable spreading cam pivoted to said housing and disposed between said housing and spring arm, the cam being manually operable to move said spring arm away from the housing in said axial direction so as to move said roller out of engagement with said road wheel, and a stop arranged on said frame to engage the spring arm on further manual operation of the cam and to retain the spring arm to perform the pivotal movement of the housing under the elastic deformation of the sleeve means in a direction opposite to the movement of the spring arm to disengage the bevel wheel from the road wheel.

2. Drive means as set forth in claim 1, in which said drive housing is connected to said frame by connecting means comprising said elastic sleeve means.

3. Drive means as set forth in claim 1, which comprises a hand lever operable to rotate said spreading cam so as to move said housing and spring arm apart.

4. Drive means as set forth in claim 1, in which said spreading cam is rotatably mounted on said housing and rotatable to move said housing and spring arm apart to a maximum extent from a normal position, in which said bevel wheel and pressure roller engage said road wheel and the stop is arranged to be engaged by said spring arm when said spreading cam has moved said housing and spring arm apart to one-half of said maximum extent from said normal position.

5. Drive means as set forth in claim 1, in which said spreading cam is adapted to assume a position of rest in which said spreading cam is spaced from said spring arm and said bevel wheel and pressure roller engage said road wheel, and further comprising a return spring urging said spreading cam to said position of rest.

6. Drive means as set forth in claim 5, in which said return spring consists of a leaf spring.

* * * * *